United States Patent
Weiss (10) Patent No.: US 6,832,513 B2
(45) Date of Patent: Dec. 21, 2004

(54) APPARATUS AND METHOD FOR TIRE TESTING

(75) Inventor: Arnold A. Weiss, 3141 Dean Ct., #803, Minneapolis, MN (US) 55416

(73) Assignee: Arnold A. Weiss, Minneapolis, MN (US)

(*) Notice: Subject to any disclaimer, the term of this patent is extended or adjusted under 35 U.S.C. 154(b) by 31 days.

(21) Appl. No.: 10/407,613

(22) Filed: Apr. 4, 2003

(65) Prior Publication Data

US 2004/0016293 A1 Jan. 29, 2004

Related U.S. Application Data

(60) Provisional application No. 60/370,175, filed on Apr. 5, 2002.

(51) Int. Cl.[7] ............................................. G01M 17/02
(52) U.S. Cl. ................................................... 73/146
(58) Field of Search ........................ 73/146, 146.2, 73/146.3, 146.4, 146.5, 146.8

(56) References Cited

U.S. PATENT DOCUMENTS

| | | |
|---|---|---|
| 1,779,907 A | 10/1930 | Dye |
| 2,345,679 A | 4/1944 | Linse |
| 2,378,237 A | 6/1945 | Morris |
| 2,503,992 A | 4/1950 | Becker |
| 2,612,772 A | 10/1952 | McConnell |
| 2,753,521 A | 7/1956 | Abrams |
| 2,940,305 A | 6/1960 | Williams |
| 2,941,144 A | 6/1960 | Cannon |
| 3,056,286 A | 10/1962 | Gibson |
| 3,148,535 A | 9/1964 | Lemelson |
| 3,228,232 A | 1/1966 | Proctor |
| 3,238,767 A | 3/1966 | Clynes |
| 3,285,059 A | 11/1966 | Bogle |
| 3,336,794 A | 8/1967 | Wysoczanski |
| 3,350,924 A | 11/1967 | King |
| 3,354,700 A | 11/1967 | Schindler |
| 3,367,173 A | 2/1968 | Uphoff |
| 3,371,524 A | 3/1968 | Wloszek |
| 3,384,733 A | 5/1968 | Burbank |
| 3,456,495 A | 7/1969 | Stinger |
| 3,465,242 A | 9/1969 | Gruetzmacher |
| 3,552,190 A | 1/1971 | Lefebvre |
| 3,555,889 A | 1/1971 | Weighart |
| 3,576,126 A | 4/1971 | Weighart |
| 3,593,120 A | 7/1971 | Mandula |

(List continued on next page.)

*Primary Examiner*—Edward Lefkowitz
*Assistant Examiner*—Andre Allen
(74) *Attorney, Agent, or Firm*—Patterson, Thuente, Skaar & Christensen, P.A.

(57) ABSTRACT

An apparatus for rotating a tire for testing wherein the tire need not be physically removed from a conveyor. A roller coupled with a drive device is supported adjacent the conveyor by a support structure. The roller is selectively positionable in a testing position, wherein the roller engages the beads of the tire and the tire is supported on the roller. In this testing position, the drive is used to selectively rotate the roller, thereby rotating the tire about a rotational axis. The detector head of a testing device disposed in the tire rolls or slides on the inside surface of the tire as it rotates to detect any flaws in the tire.

14 Claims, 5 Drawing Sheets

U.S. PATENT DOCUMENTS

| | | |
|---|---|---|
| 3,604,249 A | 9/1971 | Wilson |
| 3,631,849 A | 1/1972 | Norris |
| 3,646,805 A | 3/1972 | Walters |
| 3,665,754 A | 5/1972 | Krautkramer |
| 3,670,562 A | 6/1972 | Muto |
| 3,712,119 A | 1/1973 | Cross |
| 3,780,570 A | 12/1973 | Collins |
| 3,786,673 A | 1/1974 | Weissmann |
| 3,794,964 A | 2/1974 | Katakura |
| 3,812,708 A | 5/1974 | Cowan |
| 3,815,407 A | 6/1974 | Lavery |
| 3,871,210 A | 3/1975 | Himmler |
| 3,872,715 A | 3/1975 | Pittaro |
| 3,882,717 A | 5/1975 | McCauley |
| 3,918,025 A | 11/1975 | Koshikawa |
| 3,967,498 A | 7/1976 | Pezzillo |
| 3,978,712 A | 9/1976 | Cowan |
| 3,981,184 A | 9/1976 | Matay |
| 4,059,989 A | 11/1977 | Halsey |
| 4,065,958 A | 1/1978 | Krylova |
| 4,083,232 A | 4/1978 | Heyser |
| 4,088,028 A | 5/1978 | Hildebrandt |
| 4,089,225 A | 5/1978 | Kraska |
| 4,089,226 A | 5/1978 | Kraska |
| 4,117,733 A | 10/1978 | Gugel |
| 4,274,289 A | 6/1981 | Weiss |
| 4,279,157 A | 7/1981 | Schomberg |
| 4,285,235 A | 8/1981 | Dugger |
| 4,297,876 A * | 11/1981 | Weiss .......................... 73/146 |
| 4,327,479 A * | 5/1982 | Futterer et al. ............... 29/596 |
| 4,327,579 A | 5/1982 | Weiss |
| 4,337,660 A | 7/1982 | Weiss |
| 4,365,514 A | 12/1982 | Ho |
| 4,372,366 A | 2/1983 | Dugger |
| 4,516,068 A | 5/1985 | Hawkinson |
| 4,520,307 A | 5/1985 | Weiss |
| 5,786,535 A * | 7/1998 | Takeuchi et al. ............... 73/624 |
| 6,050,136 A | 4/2000 | Hawkinson |
| 6,179,839 B1 * | 1/2001 | Weiss et al. .................. 606/69 |
| 6,304,090 B1 | 10/2001 | Weiss |
| 6,600,326 B2 * | 7/2003 | Weiss ......................... 324/558 |
| 6,604,421 B1 * | 8/2003 | Li .............................. 73/636 |

\* cited by examiner

APPARATUS AND METHOD FOR TIRE TESTING

RELATED APPLICATIONS

This application claims benefit under 35 U.S.C. 119(e) of U.S. Provisional Patent Application Ser. No. 60/370,175 filed Apr. 5, 2002, hereby incorporated fully herein by reference.

FIELD OF THE INVENTION

The present invention relates to non-destructive testing of vehicular tires, and specifically to apparatus and methods for positioning and testing vehicular tires prior to retreading.

BACKGROUND OF THE INVENTION

It is common to retread worn vehicular tires so that the tires may be reused. Typically, a tire carcass is inspected prior to applying a new tread portion in order to detect any flaws in the carcass, such as a defect in the inner liner, that would make the carcass unsuitable for retreading until repairs can be made.

Visual inspection of a tire carcass to detect flaws has been known for many years, and is typically employed as one part of the inspection before retreading. Visual inspection, however, while useful for detecting gross flaws in tire carcasses being evaluated for possible retreading, is not suited for reliably detecting certain flaws. In particular, flaws that involve a defect too fine or too obscure to detect visually may be inadvertently overlooked and retreaded to produce a defective retreaded tire.

Various testing devices and methods have been developed to supplement visual inspection methods during the tire retreading process. Some prior methods, such as disclosed in U.S. Pat. Nos. 4,297,876 and 4,327,579 each of which is fully incorporated herein by reference, involve the use of ultrasonic energy. Other methods, such as described in U.S. Pat. Nos. 6,304,090 and 4,520,307, which are owned by the owner of the present invention and which are also incorporated fully herein by reference, involve the use of high potential electrical energy. In each of the described methods, detector portions are applied inside and outside of the tire and the tire is rotated to detect flaws.

Tires are generally moved between retread processing steps with automated conveying apparatus to save time and labor in the retreading process. In one type of conveyor in widespread use in retread shops, a series of hooks are suspended from an overhead track. Each hook has a horizontal portion for engaging and supporting the beads of a tire. The tires are moved between processing stations by sliding the hooks along the track.

In prior systems, when a tire is to be tested, it must be physically removed from the conveyor and placed in a bead spreader and/or a tire rotating machine for testing. After testing, the tire must then be physically replaced on the conveyor for further processing. Considerable time and effort is expended in the steps of physically moving tires to and from the conveyor, adding inefficiency and cost to the tire retreading process. In addition, if the tire has been buffed, the buffed surface of the tire is subjected to possible contamination.

What is needed in the industry is an apparatus and method of testing tires wherein the steps of physically moving tires to and from a conveyor for testing are eliminated.

SUMMARY OF THE INVENTION

The present invention substantially meets the needs of the industry by providing an apparatus for rotating a tire for testing wherein the tire need not be physically removed from the conveyor. In the invention, a roller coupled with a drive device is supported adjacent the conveyor by a support structure. The roller is selectively positionable in a testing position, wherein the roller engages the beads of the tire and the tire is supported on the roller. The tread area of the tire is not contacted. In this testing position, the drive is used to selectively rotate the roller, thereby rotating the tire about a rotational axis. The detector head of a testing device disposed in the tire rolls or slides on the inside surface of the tire as it rotates to detect any flaws in the tire.

The roller is also selectively positionable in a tire clearing position, wherein the roller is selectively positioned away from the tire. In this position, the tire is supported by the conveyor and may be moved by the conveyor between processing stations.

The selectively positionable roller arrangement of the invention eliminates the need for physically repositioning tires from a conveyor to a tire rotating device for testing, thus saving time and effort in the retreading process. In addition, because the invention includes a tire rotating device, the need for a separate tire rotating device is eliminated, thus saving further costs. Also, contact with the buffed surface of the tire is avoided, thereby improving the quality and reliability of the retreaded tire.

In the invention, an apparatus for selectively positioning a vehicular tire for testing includes a support structure and a tire rotating assembly operably coupled to the support structure. The tire rotating assembly includes a drive portion and at least one roller portion. The roller portion presents a longitudinal axis and is operably coupled to the drive portion so that the roller portion is selectively rotatable about the longitudinal axis with the drive portion. The roller is adapted to be selectively engagable with the bead portions of the tire so that the tire is supported thereon and so that the tire is rotated about the rotational axis when the roller is rotated about the longitudinal axis with the drive portion.

The tire rotating assembly may include a plurality of roller portions, each presenting a longitudinal axis. At least one of the plurality of roller portions is operably coupled to said drive portion in such an arrangement so that the roller portion is selectively rotatable about the longitudinal axis with the drive portion. The roller may be selectively positionable in at least a tire clearing position wherein the roller is clear of the tire, and a testing position, wherein the roller is positioned for receiving and supporting the bead portions of the tire. A linear actuator may be operably coupled to the support structure and the roller to selectively position said the roller in the tire clearing and the testing positions.

The invention also includes a system for inspecting a vehicular tire. The system includes a conveyor, an inspection apparatus positioned adjacent the conveyor, and a testing apparatus positioned proximate the inspection apparatus. The inspection apparatus includes a support structure and a tire rotating assembly operably coupled to the support structure. The tire rotating assembly includes a drive portion and at least one roller portion. The roller portion presents a longitudinal axis and is operably coupled to the drive portion so that the roller portion is selectively rotatable about the longitudinal axis with the drive portion. The roller is selectively positionable in at least a tire clearing position wherein the tire is supported by the conveyor and the tire is movable with the conveyor, and a testing position wherein the roller is engaged with the bead portions of the tire so that the tire is supported thereon and so that the tire is rotated about the rotational axis when the roller is rotated about the longitudinal axis with the drive portion. The testing apparatus has a detector head portion selectively positionable in the tire. The testing apparatus is adapted to detect flaws in the tire as the tire is rotated about the rotational axis with the detector head portion positioned in the tire.

The invention may also include a method of inspecting a vehicular tire. The method includes steps of:

(a) coupling a roller with a drive portion so that the roller is selectively rotatable about the longitudinal axis of the roller with the drive portion;

(b) coupling the roller and drive portion to a support structure;

(c) positioning the tire so that the beads of the tire are engaged with the roller and the tire is supported thereon;

(d) rotating the roller with the drive portion, thereby rotating the tire about the rotational axis; and (e) inspecting the tire as the tire is rotated about the rotational axis.

DETAILED DESCRIPTION OF THE PREFERRED EMBODIMENTS

Figure 1:
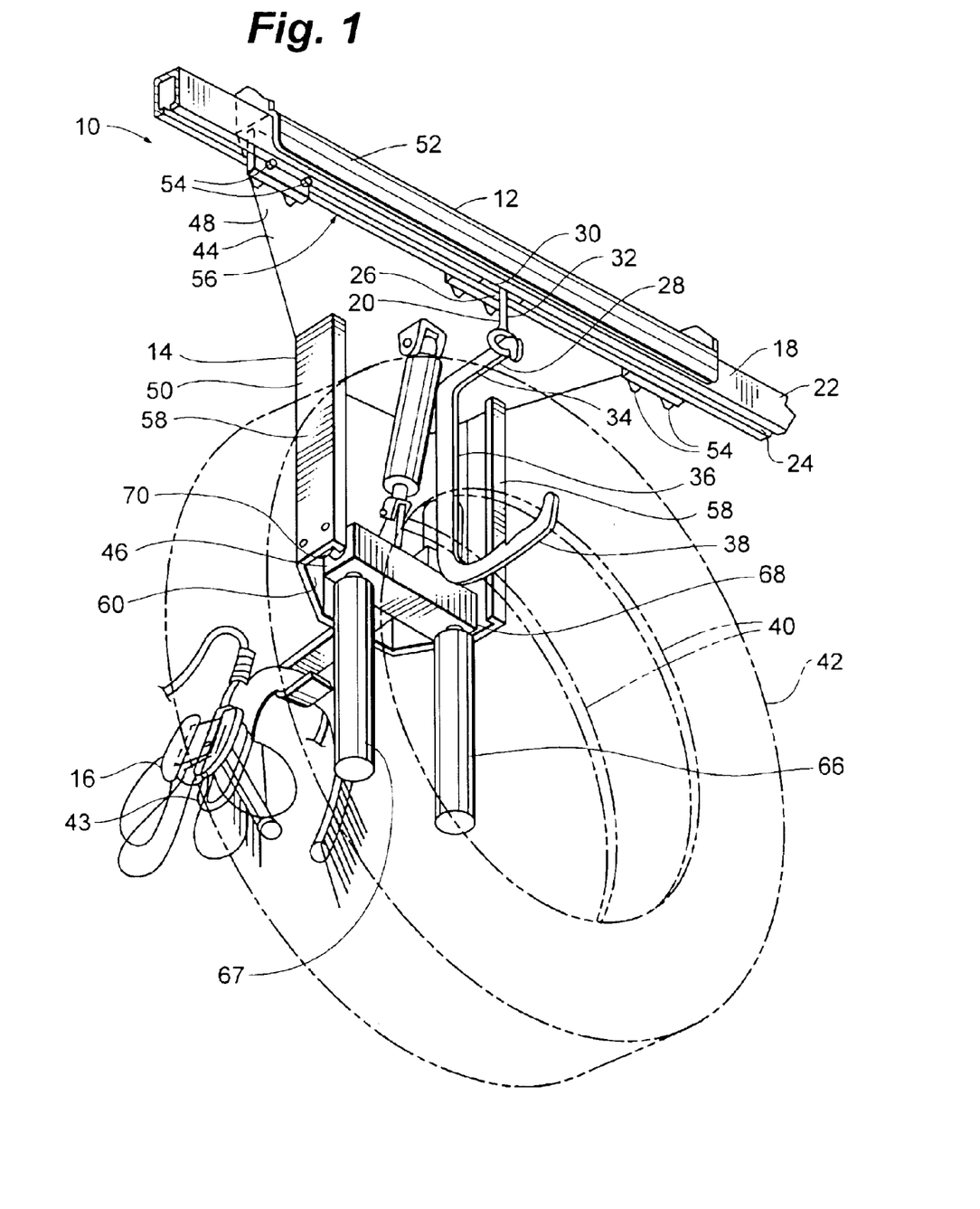
FIG. 1 is a perspective view of the tire testing apparatus and system of the present invention with a tire depicted in phantom.

Tire testing apparatus 10 generally includes conveyor 12, tire positioning apparatus 14 and high voltage testing apparatus 16. Conveyor 12 generally includes overhead track 18 and hook assembly 20. Overhead track 18 includes hollow channel member 22, which has a downwardly facing slot 24. Hook assembly 20 has an upper portion 26 and a lower portion 28. Upper portion 26 includes a slide 30 slidingly engaged in slot 24, and an eyebolt 32 projecting downward from slide 28. Lower portion 28 is hook shaped with an upper horizontal portion 34 engaging eyebolt 32, a descending vertical portion 36 and a tire engaging portion 38 oriented generally horizontally. Tire engaging portion 38 engages and supports the bead portions 40 of a tire 42 so that the tire 42 is suspended on hook assembly 20.

High voltage testing apparatus 16 is preferably a high potential electronic tire testing apparatus as described in co-pending U.S. patent application Ser. No. 60/370,176, entitled "Apparatus And Method For Electronic Tire Testing", commonly owned by the owner of the present invention, and hereby fully incorporated herein by reference. High voltage testing apparatus 16 includes a detector head 43 positionable in tire 42 to detect flaws as more fully described in the co-pending application. Of course it will be appreciated that tire testing apparatus 10 may also be usable with any other suitable detection device or method, including other electronic, acoustic, light, and radiographic methods wherein a tire is rotated for testing.

Figure 2:
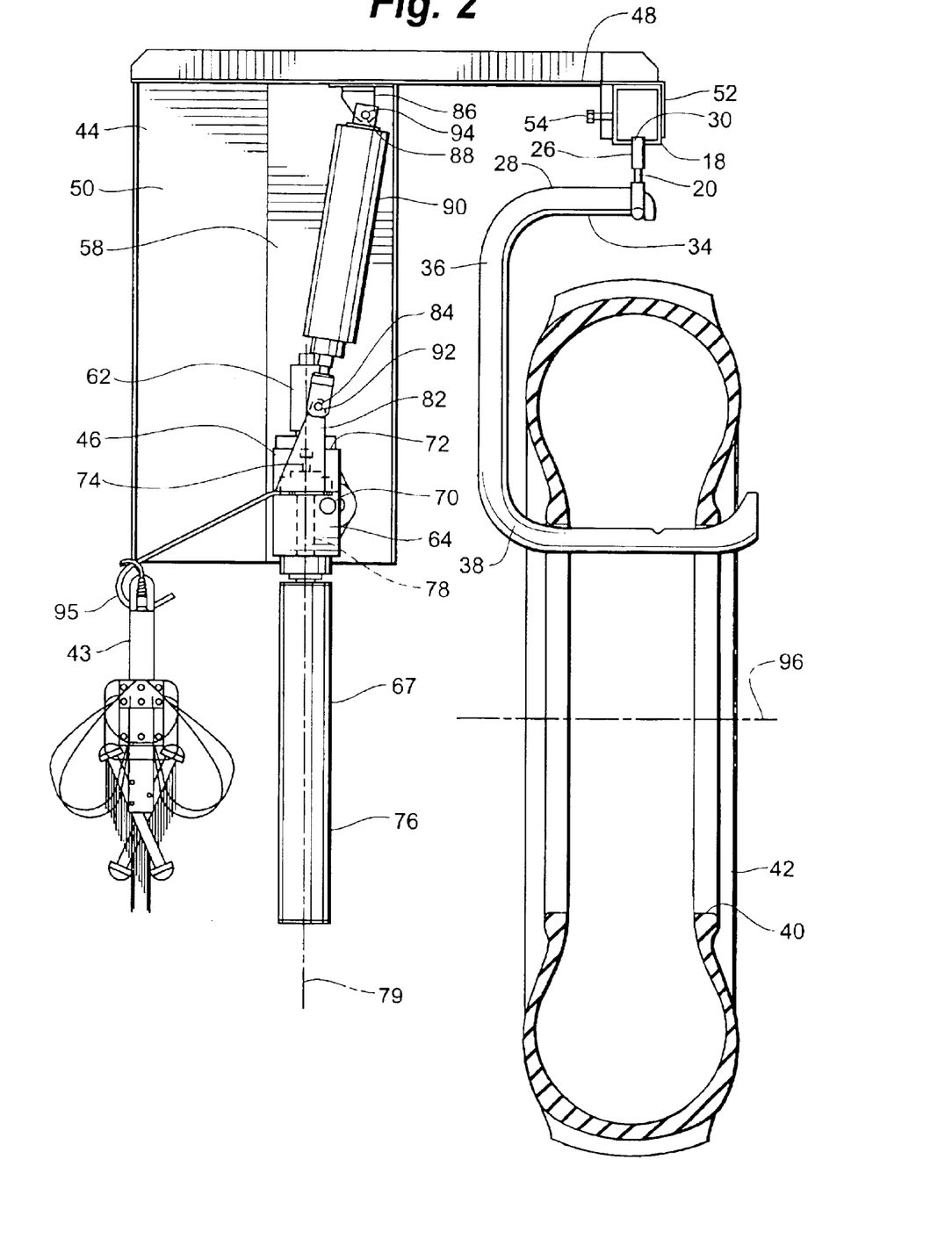
FIG. 2 is a partial cross-sectional view of the tire testing apparatus depicted with the tire rotating assembly in a tire clearing position.

Tire positioning apparatus 14 generally includes a support structure 44 and a tire rotating assembly 46. Support structure 44 generally includes horizontal plate portion 48 and downwardly projecting frame portion 50. Horizontal plate portion 48 has a channel portion 52, which fits over overhead track 18 of conveyor 12. Threaded fasteners 54 thread through inner side 56 of channel portion 52 to engage overhead track 18, thereby securing support structure 44 in place. Frame portion 50 includes a pair of spaced apart walls 58, and may also include a back portion 60 connecting and providing stiffening support to walls 58.

Of course, any other suitable support structure may be used that enables proper positioning of the tire positioning apparatus 14 as will be more fully described hereinbelow. Such alternative support structures may be attached or supported from the floor, walls, or ceiling, of a structure.

Tire rotating assembly 46 generally includes drive 62, body portion 64 and rollers 66, 67. Body portion 64 is rotatably mounted between walls 58 on a pair of pivots 68, 70. Drive 62 is attached to back side 72 of body portion 64, and has a rotating shaft 74. Drive 62 may be any suitable rotational drive device, such as an electric or pneumatic servo-motor. Rollers 66, 67 each have a tire engaging portion 76 and a projecting shaft portion 78. Each of rollers 66, 67, presents a longitudinal axis 79. Shaft portion 78 is rotatably mounted to body portion 64 in bearings 80, so that rollers 66, 67, rotate about the longitudinal axis 79. Rotating shaft 74 of drive 62 engages the shaft portion 78 of at least roller 66 so that roller 66 is selectively rotatable with drive 62.

Although tire engaging portions 76 are depicted herein as elongate cylindrical rollers, it will be readily appreciated that any other structure suitable for rolling engaging the bead portions 40 of a tire 42 may be substituted within the scope of the invention. Such other structures may, for instance, include wheels. In addition, it will be appreciated that, although two rollers 66, 67, are described herein, various other numbers and arrangements of rollers from one up to any other number of rollers may be used. Also, a roller or wheel assembly may be positioned so as to engage the inside surface of the tire in addition to, or instead of, the bead portions 40.

Body portion 64 may include a projecting tab portion 82 with an aperture 84. Plate portion 48 may have a corresponding downwardly projecting tab portion 86 with an aperture 88. A linear actuator 90 is mounted between tab portions 82, 86, with pivot pins 92, 94, extending through apertures 84, 88. With this arrangement, linear actuator 90 may be selectively extended to pivot rollers 66, 67, into the testing position as depicted best in FIG. 4, and retracted to pivot rollers 66, 67, into the tire clearing position as depicted best in FIG. 2. A hanger 95 may be provided to hang detector head 43 in a position convenient for use.

Figure 3:
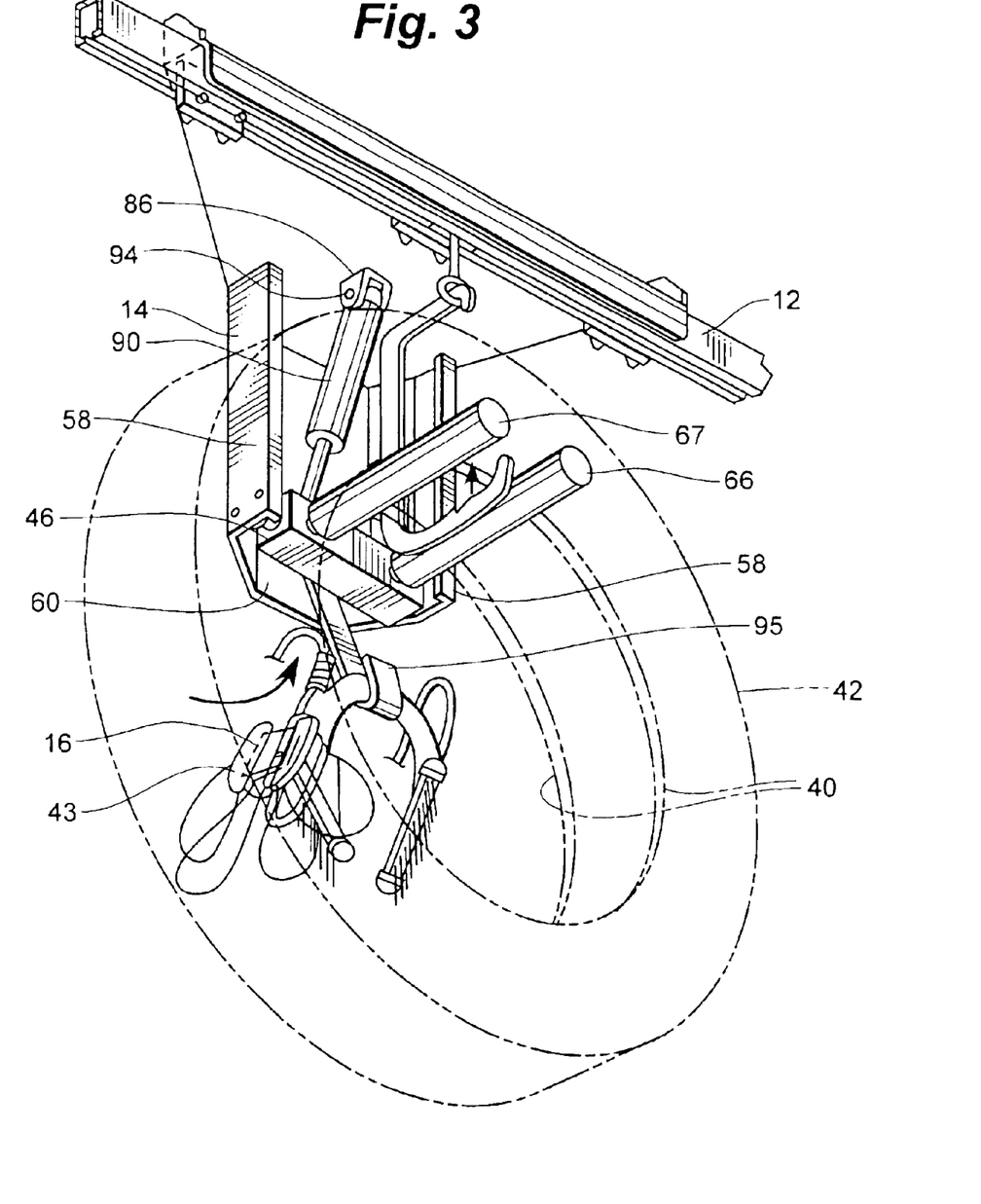
FIG. 3 is a perspective view of the tire testing apparatus and system of the present invention depicted with the tire rotating assembly in a testing position.

In operation, a tire 42 is placed with beads 40 resting on the tire engaging portion 38 of hook assembly 20. Hook assembly 20 is slid along overhead track 18 until tire 42 is positioned proximate tire positioning apparatus 14 as depicted best in FIGS. 1 and 2. Linear actuator 90 is retracted so that rollers 66, 67, are positioned in the tire clearing position. Preferably, the longitudinal axes 79 of the rollers 66, 67 are positioned generally vertically in the tire clearing position as depicted. Any other orientation wherein the rollers 66, 67, are clear of the tire may also be used, however. When linear actuator 90 is extended, as depicted best in FIGS. 3–5, body portion 64 pivots upward so that rollers 66, 67, are positioning in the testing position. Preferably, the longitudinal axes 79 are positioned generally horizontally.

Figure 4:
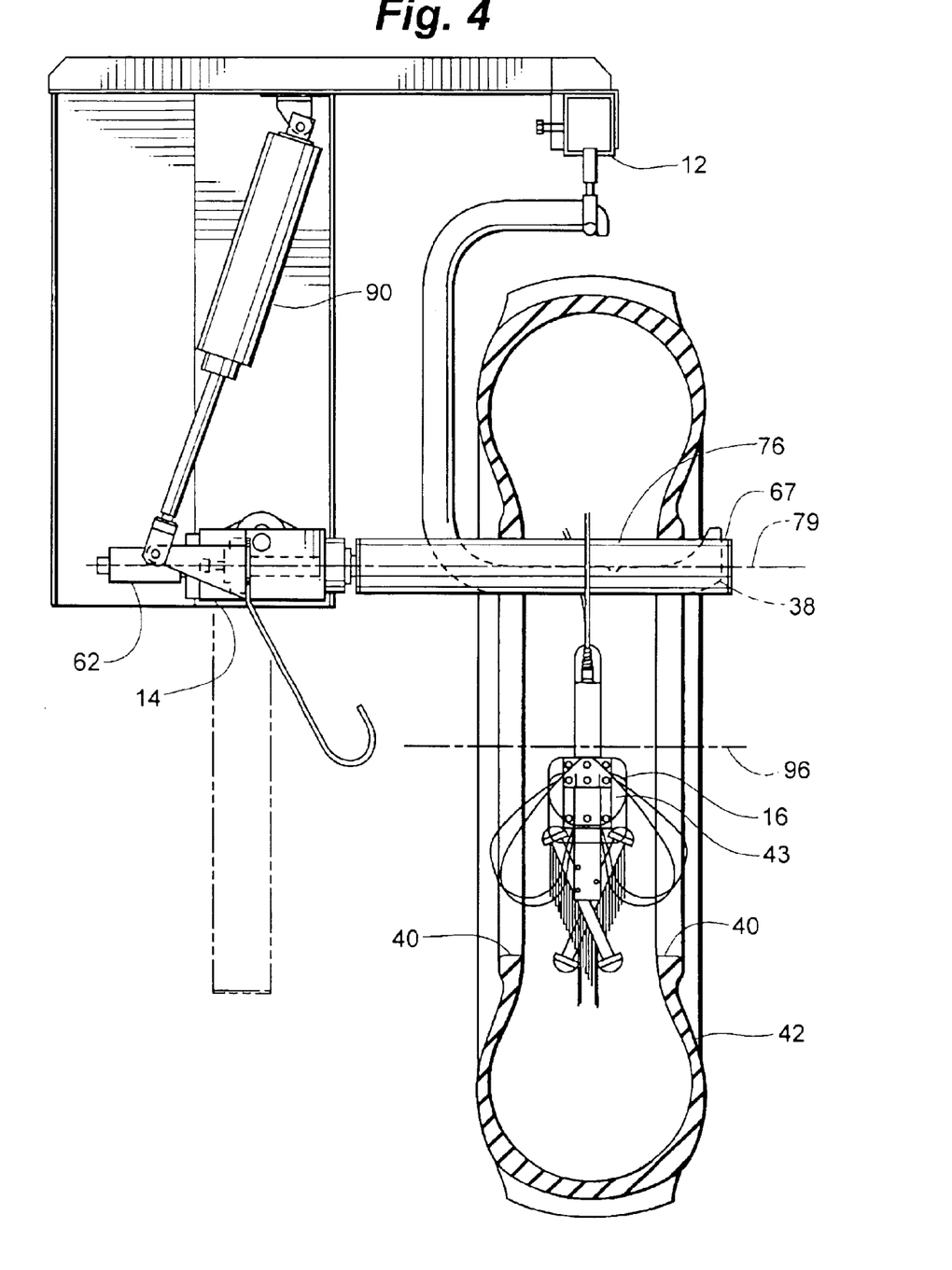
FIG. 4 is a partial cross-sectional view of the tire testing apparatus depicted with the tire rotating assembly in a testing position.
Figure 5:
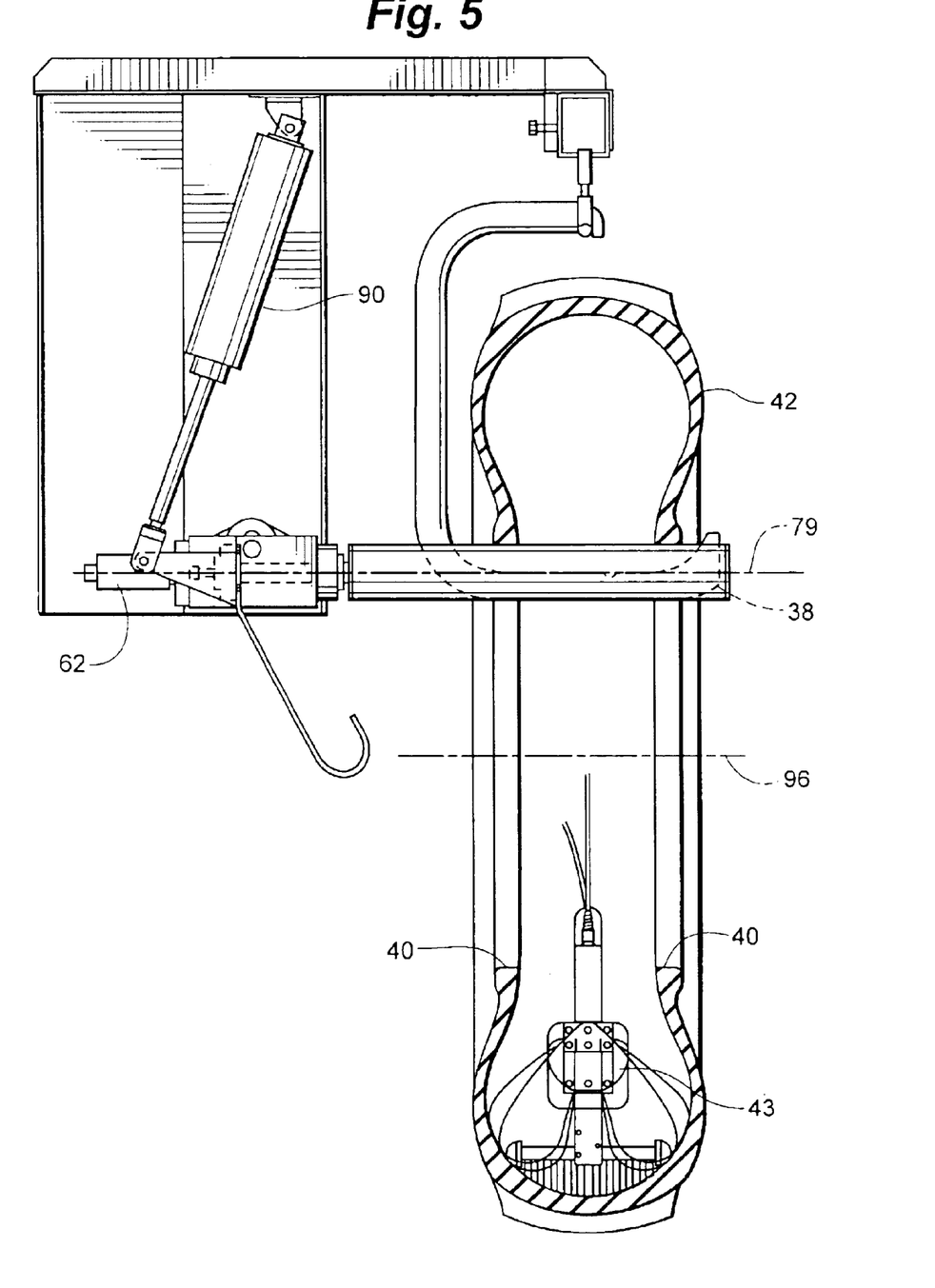
FIG. 5 is partial cross-sectional view similar to FIG. 4 and depicting rotational movement of the tire with the tire rotating assembly.

As roller 66, 67, pivot into position, tire engaging portions 76 of rollers 66, 67, engage beads 40 of tire 42, and lift the tire 42 off of tire engaging portions 38 of hook assembly 20. In this position, a detector head 43 is positioned in the tire as depicted in FIGS. 4 and 5. Drive 62 is then actuated, rotating roller 66. Since beads 40 of tire 42 are resting on roller 66 and the tire 42 is supported thereon, the rotation of roller 66 causes tire 42 to rotate about rotational axis 96. Detector head 43 rolls or slides on the inside surface 98 of tire 42, detecting any flaws as it moves. Once the tire 42 has made one complete rotation and all of the inner surface 98 has been tested, drive 62 may be deactivated so that roller 66 stops. Detector head 43 may be removed from the tire, and linear actuator 90 retracted. As rollers 66, 67, pivot downward, beads 40 engage tire engage portion 38 of hook assembly 20 so that the tire 42 is again supported from conveyor 12. Once rollers 66, 67, are positioned in the tire clearing position, hook assembly 20 may be slid along overhead track 18 to move the tire on to the next processing station.

What is claimed is:

1. An apparatus for selectively positioning a vehicular tire for testing, the tire having a pair of bead portions and presenting a rotational axis, the apparatus comprising:
   a support structure; and
   a tire rotating assembly operably coupled to the support structure, the tire rotating assembly including:
      a drive portion; and
      at least one roller portion operably coupled with the drive portion and presenting a longitudinal axis, said at least one roller portion being selectively rotatable about the longitudinal axis with said drive portion, said at least one roller portion being selectively positionable in at least a first tire clearing position, wherein the at least one roller is clear of the tire, and a second testing position, wherein said at least one roller is positioned for receiving the bead portions of the tire so that the tire is supported thereon, and so that the tire is rotated about the rotational axis when said at least one roller is rotated about the longitudinal axis with said drive portion.

2. The apparatus of claim 1, wherein said tire rotating assembly includes a plurality of roller portions, each presenting a longitudinal axis, at least one of said plurality of roller portions operably coupled to said drive portion so that said roller portion is selectively rotatable about the longitudinal axis with said drive portion.

3. The apparatus of claim 1, further comprising a linear actuator operably coupled to the support structure and the at least one roller, said linear actuator adapted to selectively position said at least one roller in said tire clearing and said testing positions.

4. A system for inspecting a vehicular tire, the tire having a pair of bead portions and presenting a rotational axis, the system comprising:
   a conveyor;
   an inspection apparatus positioned adjacent the conveyor, the inspection apparatus including a support structure and a tire rotating assembly operably coupled to the support structure, the tire rotating assembly including a drive portion and at least one roller portion, said at least one roller portion presenting a longitudinal axis and being operably coupled to the drive portion so that said at least one roller portion is selectively rotatable about the longitudinal axis with said drive portion, wherein said at least one roller is selectively positionable in at least a tire clearing position wherein the tire is supported by said conveyor and the tire is movable with said conveyor, and a testing position wherein said at least one roller is engaged with the bead portions of the tire so that the tire is supported thereon and so that the tire is rotated about the rotational axis when said at least one roller is rotated about the longitudinal axis with said drive portion; and
   a testing apparatus positioned proximate the inspection apparatus and having a detector head portion selectively positionable in the tire, said testing apparatus adapted to detect flaws in the tire as the tire is rotated about the rotational axis with said detector head portion positioned in the tire.

5. The system of claim 4, wherein said tire rotating assembly includes a plurality of roller portions, each presenting a longitudinal axis, at least one of said plurality of roller portions operably coupled to said drive portion so that said roller portion is selectively rotatable about the longitudinal axis with said drive portion.

6. The system of claim 4, wherein the longitudinal axis of said at least one roller is generally vertical when said at least one roller is positioned in the tire clearing position, and wherein the longitudinal axis of said at least one roller is generally horizontal for receiving and supporting the bead portions of the tire when said at least one roller is positioned in the testing position.

7. The system of claim 4, further comprising a linear actuator operably coupled to the support structure and the at least one roller, said linear actuator adapted to selectively position said at least one roller in said tire clearing and said testing positions.

8. The system of claim 4, wherein said conveyor includes a track portion and at least one tire hanger portion slidingly engaged with said track portion, said tire hanger portion including a generally horizontally oriented portion adapted to engage and support the bead portions of the tire thereon.

9. The system of claim 4, wherein testing apparatus includes a high potential electrical tire testing apparatus.

10. An apparatus for selectively positioning a vehicular tire for inspection, the tire having a pair of bead portions and presenting a rotational axis, the apparatus comprising:
   a support means; and
   means for rotating the tire operably coupled to the support means, said means for rotating the tire being selectively engagable with the bead portions of the tire so that the tire is supported thereon, said means for rotating the tire adapted so that the tire is selectively rotatable thereby when the tire is supported thereon wherein said means for rotating the tire includes a tire rotating assembly, the tire rotating assembly including a drive portion and at least one roller portion, said at least one roller portion presenting a longitudinal axis and being operably coupled to the drive portion so that said at least one roller portion is selectively rotatable about the longitudinal axis with said drive portion, wherein said at least one roller is adapted to be selectively engagable with the bead portions of the tire so that the tire is supported thereon and so that the tire is rotated about the rotational axis when said at least one roller is rotated about the longitudinal axis with said drive portion.

11. The apparatus of claim 10, wherein said tire rotating assembly includes a plurality of roller portions, each presenting a longitudinal axis, at least one of said plurality of roller portions operably coupled to said drive portion so that said roller portion is selectively rotatable about the longitudinal axis with said drive portion.

12. The apparatus of claim 10, wherein said at least one roller is selectively positionable in at least a tire clearing position wherein said at least one roller is clear of said tire, and a testing position, wherein said at least one roller is positioned for receiving and supporting the bead portions of the tire.

13. The apparatus of claim 12, further comprising a linear actuator operably coupled to the support structure and the at least one roller, said linear actuator adapted to selectively position said at least one roller in said tire clearing and said testing positions.

14. A method of inspecting a vehicular tire, the tire having a pair of bead portions and presenting a rotational axis, the method comprising steps of:

coupling a roller with a drive portion so that the roller is selectively rotatable about the longitudinal axis of the roller with the drive portion;

coupling the roller and drive portion to a support structure so that the roller is selectively positionable in at least a tire clearing position wherein the roller is clear of the tire, and a testing position, wherein the roller is positioned to receive and support the bead portions of the tire thereon;

positioning the tire adjacent the roller with the roller positioned in the tire clearing position;

positioning the roller in the testing position, thereby engaging the beads of the tire with the roller so that the tire is supported thereon;

rotating the roller with the drive portion, thereby rotating the tire about the rotational axis; and inspecting the tire as the tire is rotated about the rotational axis.

* * * * *